(12) United States Patent
Xiao (10) Patent No.: US 6,795,245 B2
(45) Date of Patent: Sep. 21, 2004

(54) POLARIZATION INDEPENDENT MAGNETOOPTIC SWITCHES

(76) Inventor: Rongfu Xiao, 43305 Livermore Common, Fremont, Alameda, CA (US) 94539

( * ) Notice: Subject to any disclaimer, the term of this patent is extended or adjusted under 35 U.S.C. 154(b) by 29 days.

(21) Appl. No.: 09/995,391

(22) Filed: Nov. 26, 2001

(65) Prior Publication Data

US 2002/0171932 A1 Nov. 21, 2002

Related U.S. Application Data

(60) Provisional application No. 60/291,956, filed on May 21, 2001.

(51) Int. Cl.[7] ............................................. G02B 27/28
(52) U.S. Cl. ........................ 359/495; 359/484; 359/281; 385/11
(58) Field of Search ................................. 359/484, 483, 359/280, 494, 495, 496, 497, 240, 281, 282; 385/22, 11

(56) References Cited

U.S. PATENT DOCUMENTS

| | | | |
|---|---|---|---|
| 4,355,864 A | 10/1982 | Soref | 385/18 |
| 4,410,238 A | 10/1983 | Hanson | 349/196 |
| 4,522,473 A | 6/1985 | Hibiya et al. | 359/324 |
| 5,321,774 A * | 6/1994 | Barnard et al. | 385/16 |
| 5,521,741 A * | 5/1996 | Umezawa et al. | 359/246 |
| 5,627,924 A * | 5/1997 | Jin et al. | 385/16 |
| 5,724,165 A * | 3/1998 | Wu | 398/55 |
| 5,812,304 A | 9/1998 | Shirasaki et al. | 359/324 |
| 5,923,472 A | 7/1999 | Bergmann | 359/618 |
| 5,982,539 A * | 11/1999 | Shirasaki | 359/484 |
| 6,173,092 B1 | 1/2001 | Bergmann | 385/16 |
| 6,226,115 B1 | 5/2001 | Shirasaki et al. | 359/280 |
| 6,577,430 B1 * | 6/2003 | Jin et al. | 359/280 |

* cited by examiner

Primary Examiner—Arnel C. Lavarias
(74) Attorney, Agent, or Firm—Sawyer Law Group LLP (57) ABSTRACT

This invention provides polarization independent magnetooptic switches. Input optical signals are switched to different output ports via polarization manipulation utilizing magnetically switchable Faraday rotators, polarization beam splitters (PBS) and polarization beam combiners (PBC). The Faraday rotators are Bi-substituted magnetic garnet with small coercivity, and PBS/PBC made from birefringence crystals. The switching Faraday rotator is mounted inside a soft magnetic ferrite core, which is magnetized by an electric coil outside. To ensure a high switching speed, the selected ferrite core exhibits high frequency characteristic. Based on the same principle of polarization manipulation, a latching magnetooptic switch (only a current pulse is required) can be built using a latchable Faraday rotator as a switching control unit. The advantages of these magnetooptic switches are high speed (~µs or faster), low insertion loss, low PDL and PMD, compactness in size, no moving parts and no liquid in the device.

12 Claims, 11 Drawing Sheets

POLARIZATION INDEPENDENT MAGNETOOPTIC SWITCHES

CROSS-RELATED APPLICATION

This application claims priority under 35 U.S.C. §119(e) of provisional patent application No. 60/291,956, filed May 21, 2001.

BACKGROUND OF THE INVENTION

Optic switches are indispensable in future all-optical broadband telecommunication systems. The current optical switches include optical mechanical switches (OMS) including MEMS, thermooptic switches (TOS); liquid crystal switches (LCS) and electro-optic switches (EOS). The drawback of OMS/MEMS, TOS and LCS are their low speed (switching time ~10 ms or longer) and poor mechanical reliability. Although EQS is fast (switching speed can be a few nano-seconds), its complicated fabrication process, polarization dependence and huge optical insertion loss limit its applications.

The magnetooptic switches in accordance with the present invention are based on light polarization manipulation using Faraday rotators and polarization beam splitters/combiners, and will not have the above drawbacks.

SUMMARY OF THE INVENTION

The magnetooptic switches (MOS) in accordance with the present invention are based on magnetooptic effects in Faraday rotators. In particular, switching Faraday rotators are utilized in combination with polarization beam splitters/combiners (PBS) and walk-off plates. The mechanism of the magnetooptic switches is based on light polarization manipulation. The Faraday rotators are Bi-substituted magnetic garnets with small saturation fields, and the PBS is made from birefringence crystals (such as TiO2, YVO4, . . . ). The switching Faraday rotator is mounted inside a magnetically soft ferrite core, which is magnetized by an electric coil surrounding the ferrite core when an electrical current is applied to the electric coil. To ensure high switching speed, the ferrite core is selected to exhibit high frequency (>10 MHz) characteristics. When a magnetic field is generated by the electric current in the coil, the ferrite core will be magnetized to produce a magnetic field large enough to switch the Faraday rotator, which, in turn, changes the polarization rotation of the linearly polarized lights. Based on the same principle of polarization manipulation, a latching magnetooptic switch (only a current pulse is required) can be built using a latchable Faraday rotator as a switching control unit. The magnetooptic switch can be either a transmissive or reflective type. The advantage of a reflective-type switch is the fact that less optical parts are needed and also a leak portion can be used as a monitoring signal. The advantages of these magnetooptic switches include: high speed (~µs or faster), low insertion loss, low polarization dependent loss (PDL) and polarization mode dispersion (PMD), compactness in size, no moving parts, and no liquid and organic materials in the optical path.

BRIEF DESCRIPTION OF THE DRAWINGS

The various designs of magnetooptic switches are schematically illustrated in the following figures.

DESCRIPTION OF THE INVENTION

The present invention provides polarization independent magnetooptic switches. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 17 in conjunction with the discussion below.

Figure 1:
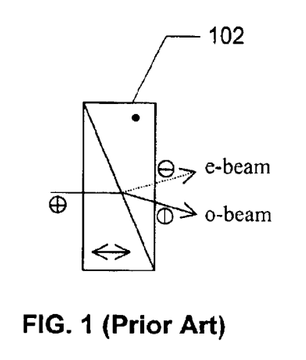
FIG. 1 illustrates a Wollaston prism which splits an un-polarized light into two separate (o- and e-) beams (with polarization direction mutually perpendicular).

FIG. 1 illustrates a Wollaston prism 102 which splits an un-polarized light into two separate (o- and e-) beams, with polarization directions mutually perpendicular. The functioning of a Wollaston prism is well known in the art and will not be further described here.

Figure 2:
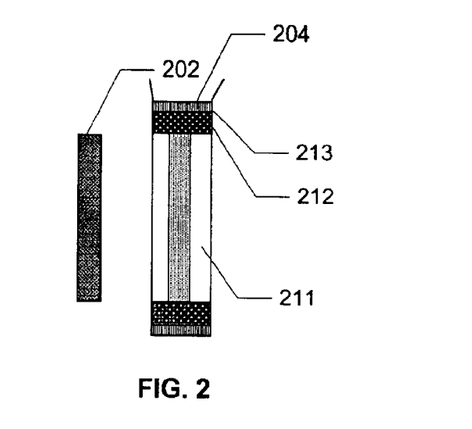
FIG. 2 illustrates a pair of Faraday rotators in accordance with the present invention.

FIG. 2 illustrates a pair of Faraday rotators in accordance with the present invention. The pair of Faraday rotators comprises a latched Faraday rotator 202 which comprises a permanent magnetic garnet. The latched Faraday rotator 202 is Bi-substituted with a thickness which is enough to achieve about a 45 degree rotation at a given wavelength (such as 1550 nm). The pair of Faraday rotators also comprises a switching Faraday rotator 204 which comprises a Faraday rotator 211 mounted within a ferrite core 212, and an electric coil 213 surrounding the ferrite core 212. A current may be provided to the electric coil 213, creating a magnetic field. The current-produced magnetic field is enhanced by the ferrite core 212, which is large enough to cause the Faraday rotator 211 to rotate a polarization direction of a light either about 45 degree clockwise (CW) or counter-clockwise (CCW), depending on the direction of the current. The switching Faraday rotator 204 should have a small saturation field so that only a small current is needed. The Faraday rotator 211 can be either non-latched or latched with a hysteresis loop. For a latched Faraday rotator 211, only a pulsed current is needed to set the polarization By combining the latched Faraday rotator 202 and the switchable Faraday rotator 204, the polarization angle of a light traversing therethrough can be either about 0 degrees when the magnetic field in the switching Faraday rotator 204 is opposite to that of the latched Faraday rotator 202, or about 90 degrees when the magnetic field in the switching Faraday rotator 204 is in the same direction as in the latched Faraday rotator 202. The position of the latched Faraday rotator 202 and the switching Faraday rotator 204 can be exchanged without affecting the output.

Figure 3:
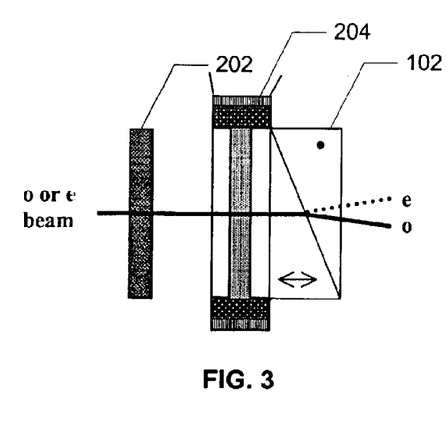
FIG. 3 illustrates a combination of the pair of Faraday rotators and the Wollaston prism in accordance with the present invention.

FIG. 3 illustrates a combination of a pair of Faraday rotators and a Wollaston prism in accordance with the present invention. The latched Faraday rotator 202 and the switching Faraday rotator 204 are combined with the Wollaston prism 102. With a current provided to the electric coil 213 in a particular direction, the Wollaston prism 102 deflects the o-beam in one direction and the e-beam in another direction.

Figure 4:
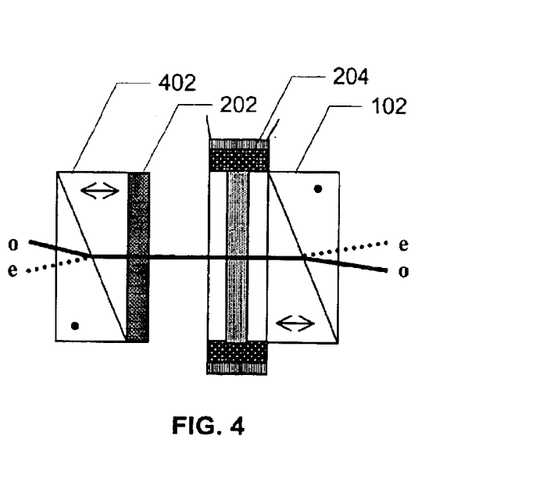
FIG. 4 illustrates a 2×2 polarization dependent switch comprising an addition of one more Wollaston prisms to the combination illustrated in FIG. 3 in accordance with the present invention.

FIG. 4 illustrates a 2×2 polarization dependent switch comprising an addition of one more Wollaston prisms to the switching Faraday rotator illustrated in FIG. 3 in accordance with the present invention. By adding the second Wollaston prism 402 to the combination of FIG. 3, switching one or more lights of arbitrary polarization may be provided through the second Wollaston prism 402.

Figure 5:
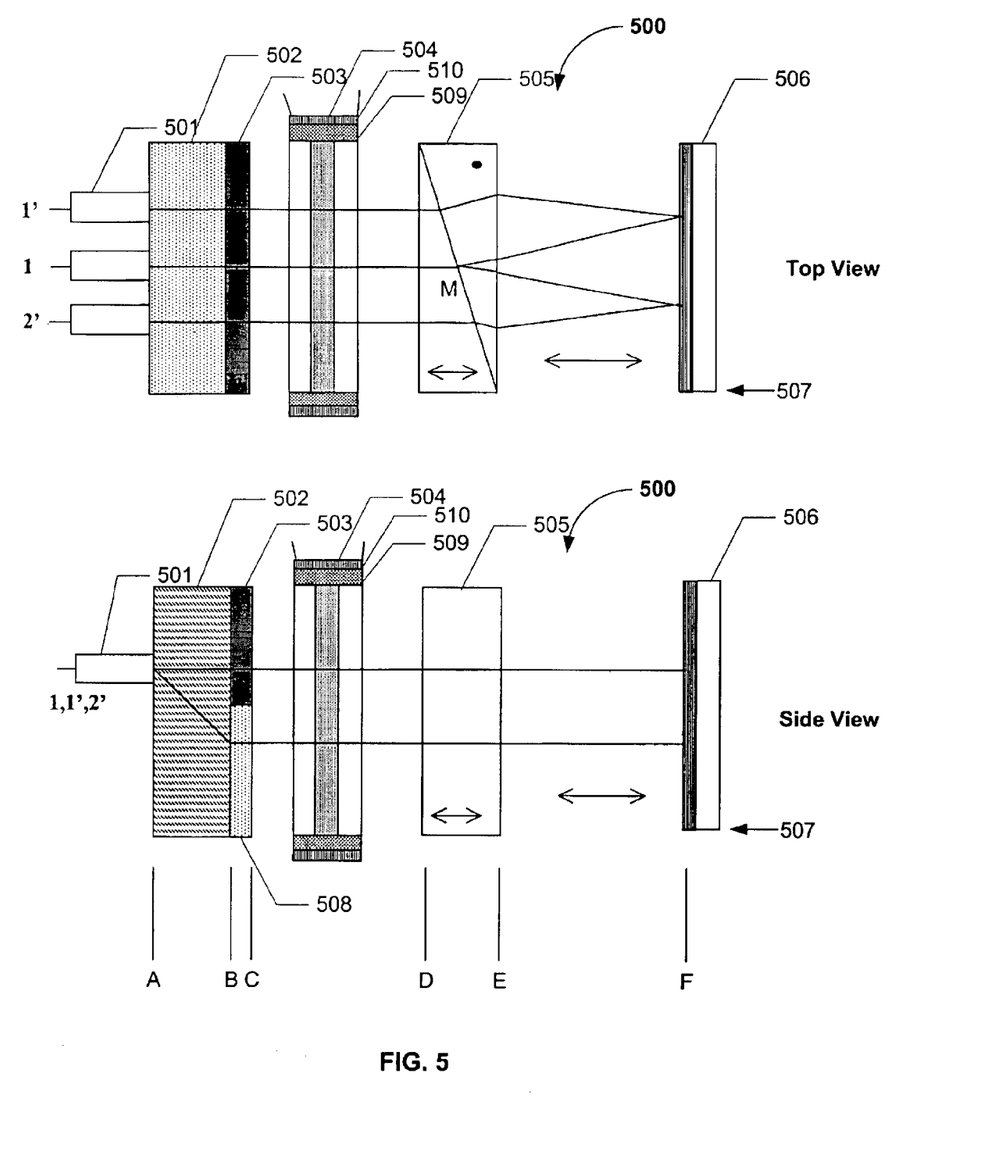
FIG. 5 illustrates a top view and a side view of a first preferred embodiment of a polarization independent 1×2 magnetooptic switch in accordance with the present invention.

FIG. 5 illustrates a top view and a side view of a first preferred embodiment of a polarization independent 1×2 magnetooptic switch in accordance with the present invention. The switch 500 is a reflective-type and comprises three collimators 501, one for an input port 1 and two for output ports 1' and 2'. The collimators 501 are aligned at the same height. The switch 500 also comprises a polarization beam splitter 502 (PBS), two latched rotators 503 and 508, a switching Faraday rotator 504, a Wollaston prism 505, and a reflector 506. The PBS 502 has an optical axis tilted approximately 45 degrees towards the "bottom" 507. The latched rotator 503 rotates a polarization direction of a light about 45 degrees CW, and the latched rotator 508 rotates a polarization direction of a light about 45 degrees CCW. The switching Faraday rotator 504 rotates a polarization direction of a light either about 45 degrees CW or 45 degrees CCW. It comprises a ferrite core 509 and an electric coil 510 surrounding the ferrite core 509, and functions similarly to the switching Faraday rotator 204, described above. The reflector 506 is made either from a high-reflective metallic film (such as thin film Ag or Au) or dielectric multilayer. The advantage of the switch 500 is that the lateral distance between the neighboring input port 1 and exit ports 1' and 2' can be adjusted by moving the reflector 506 toward or away from the Wollaston prism 505.

Figure 6:
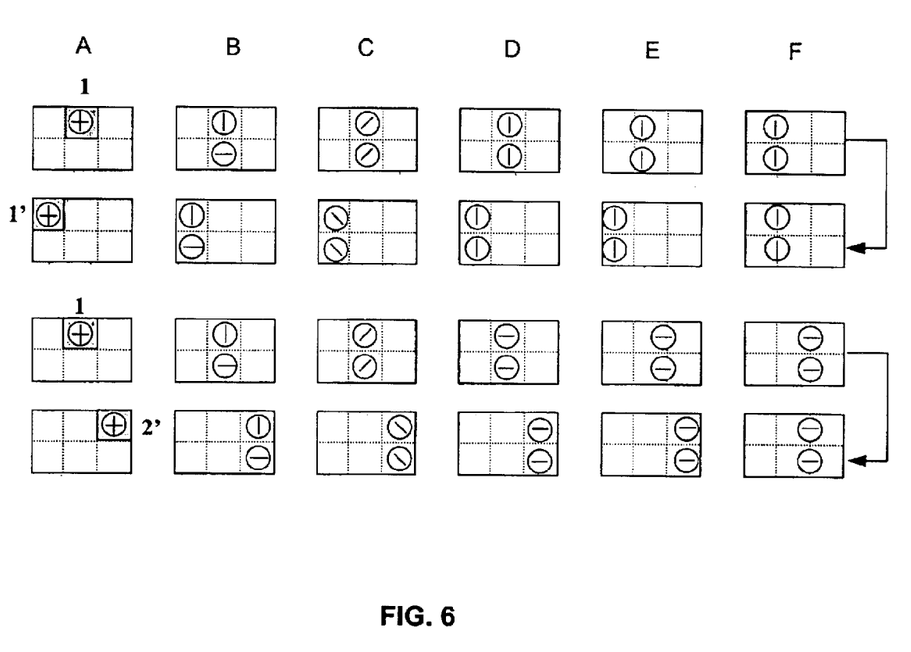
FIG. 6 illustrates the polarization states and positions of the light after passing through each component of the switch illustrated in FIG. 5.

FIG. 6 illustrates the polarization states and positions of the light after passing through each component of the switch 500 illustrated in FIG. 5. The states and positions illustrated at each letter A–F correspond to locations A–F at the switch 500, as labeled in FIG. 5. The upper two diagrams illustrate a light as it travels between port 1 and port 1'. The lower two diagrams illustrate a light as it travels between port 1 and port 2'.

Referring to both FIGS. 5 and 6, a light with arbitrary polarization traverses from the input port 1 and is collimated by the collimators 501 at location A. The PBS 502 (e.g. YVO4 crystal with its optical axis 45 degree tilted downward with respect to the input optical beam) splits the arbitrarily polarized (could be any polarization state) input beam into o-(ordinary) and e-(extra-ordinary) beams (refer to the side view) at location B. The o- and e-beams further traverse the pair of latched rotators 503, 508 with opposite rotational angles at location C. The latched rotators 503, 508 could be made from a pair of half wave plates (with a tilting angle of about 22.5 degrees CW and 22.5 degrees CCW with respect to the polarization direction of the o-beam) or a pair of latched Faraday rotators (higher coercivity is preferred) with opposite rotation angles of about 45 degrees. After passing through the latched rotators 503, 508, the two parallel beams enter the switching Faraday rotator 504 with its rotation angle set at either about 45 degrees CW or at 45 degrees CCW, depending on the direction of current applied to the electric coil 510 surrounding the ferrite core 509 at location D. In the upper two diagrams of FIG. 6, the switching Faraday rotator 504 rotates the polarization direction of the light by about 45 degrees CCW. In the lower two diagrams of FIG. 6, the switching Faraday rotator 504 rotates the polarization direction of a light by about 45 degrees CW. The switching Faraday rotator 504 has a small saturation field (preferably Hs<100 Oe). Following the switching Faraday rotator 504 is a Wollaston prism 505 which guides the polarized light moving either "upwards" or "downwards" depending on the polarization state of the light at location M. Then, the light will be reflected back at location F to the Wollaston prism 505 by the reflector 506 with a lateral shift at location D, which defines the separation distance between input port 1 and output ports 1' or 2'. The switching Faraday rotator 504 rotates the polarization direction of the lights by about 45 degrees CW at location C. The latched rotator 503 rotates the polarization direction of the upper beam about 45 degrees CW while the latched rotator 508 rotates the lower beam about 45 degrees CCW at location B. (See side view in FIG. 5) The PBS 502 combines the o- and e-beams at location A. The combined light is collected/collimated to exit ports 1' or 2', depending on the switching current of the switching Faraday rotator 504.

The switch 500 is described above for a light traversing through the switch 500 in a forward direction. The switch 500 is bi-directional, thus it also will function for a light traversing through the switch 500 in a reversed direction, i.e., from port 1' to port 1 or from port 2' to port 1, occurs in a similar manner.

Figure 7:
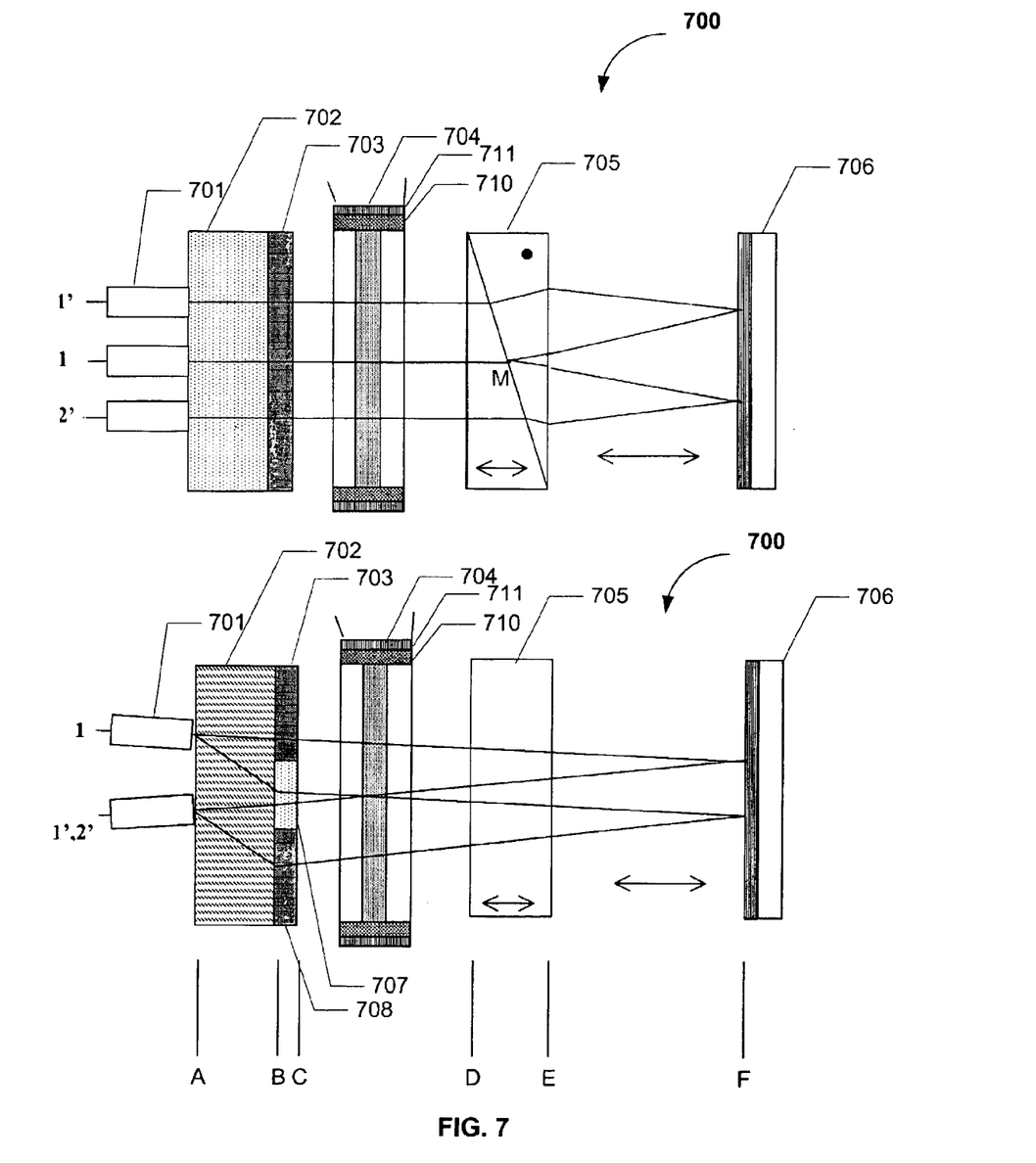
FIG. 7 illustrates a top view and a side view of a second embodiment of a polarization independent 1×2 magnetooptic switch in accordance with the present invention.

FIG. 7 illustrates a top view and a side view of a second preferred embodiment of a polarization independent 1×2 magnetooptic switch in accordance with the present invention. The switch 700 is a reflective type and comprises collimators 701, a PBS 702, three latched rotators 703, 707, 708, a switching Faraday rotator 704, a Wollaston prism 705, and a reflector 706. The collimators 701 are optically coupled to the input port 1, which sits at an upper level, and the two output ports 1' and 2', which sit at the lower level. The latched rotators 703 and 708 rotate a polarization direction of a light about 45 degrees in a first direction. The latched rotator 707 rotates a polarization of a light about 45 degrees in an opposite direction. The switching Faraday rotator 704 rotates a light either about 45 degrees CW or 45 degrees CCW. It comprises a ferrite core 710 and an electric coil 711 surrounding the ferrite coil 710, and functions similarly to the switching Faraday rotator 204, described above. The reflector 706 is slightly tilted so that the reflected light bends "down" to the lower ports 1' and 2'.

Figure 8:
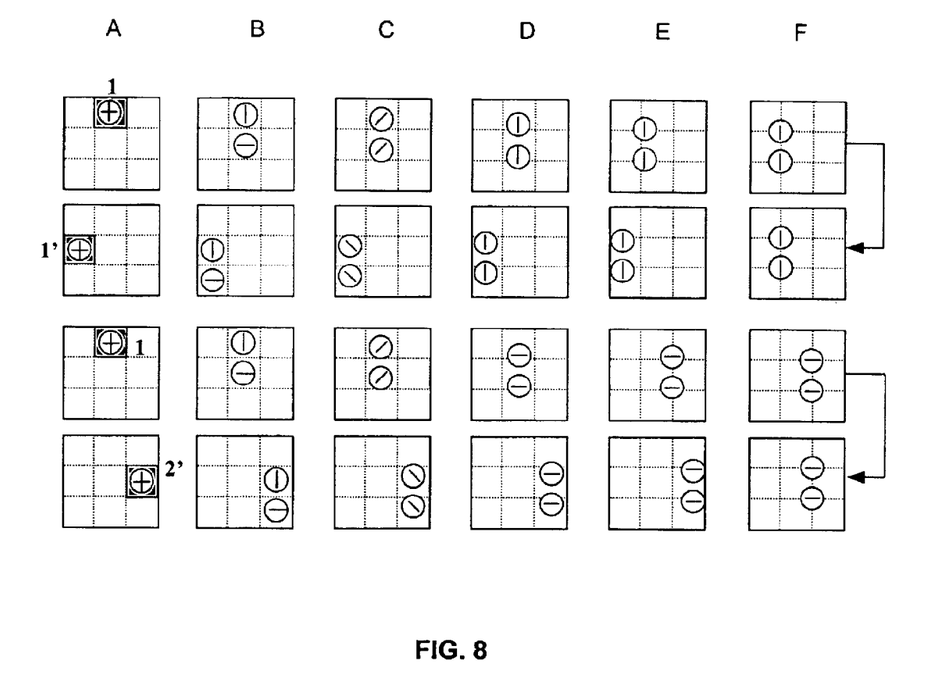
FIG. 8 illustrates the polarization states and positions of the light after passing through each component of the switch illustrated in FIG. 7.

FIG. 8 illustrates the polarization states and positions of the light after passing through each component of the switch 700 illustrated in FIG. 7. The states and positions illustrates illustrated at each letter A–F correspond to locations A–F at the switch 700, as labeled in FIG. 7. The upper two diagrams illustrate a light as it travels between port 1 and port 1'. The lower two diagrams illustrate a light as it travels between port 1 and port 2'. Note that the beams in this diagram move in two-dimensions, in contrast to that of FIG. 6.

Referring to both FIGS. 7 and 8, a light with arbitrary polarization traverses from the input port 1 and is collimated by the collimators 701 at location A. The PBS 702 splits the arbitrarily polarized input beam into o- and e- beams at location B. The o- and e-beams further traverse the latched rotators 703 and 707 with opposite rotational angles at location C. The o-beam is rotated by the latched rotator 703 by about 45 degrees CW. The e-beam is rotated by the latched rotator 707 by about 45 degrees CCW. The two beams are now parallel. After passing through the latched rotators 703 and 707, the two beams enter the switching Faraday rotator 704 with its rotation angle set at either about 45 degrees CW or at 45 degrees CCW, depending on the direction of current applied to the electric coil 711 surrounding the ferrite core 710 at location D. In the upper two diagrams of FIG. 8, the switching Faraday rotator 704 rotates the polarization direction of the light by about 45 degrees CCW. In the lower two diagrams of FIG. 8, the switching Faraday rotator 704 rotates the polarization direction of a light by about 45 degrees CW. The switching Faraday rotator 704 has a small saturation field. Following the switching Faraday rotator 704 is a Wollaston prism 705 which guides the polarized light moving either "upwards" or "downwards" depending on the polarization state of the light at location M. Then, the light will be reflected back by the reflector 706 at location F to the Wollaston prism 705 with a lateral shift at location D, which defines the separation distance between input port 1 and output ports 1' or 2'. The switching Faraday rotator 704 rotates the polarization direction of the lights by about 45 degrees CW at location C. The latched rotator 708 rotates the polarization direction of the beam passing through it about 45 degrees CW while the latched rotator 707 rotates the beam passing through it about 45 degrees CCW at location B. The PBS 702 combines the o- and e-beams at location A. The combined light is collected/collimated to exit ports 1' or 2', depending on the switching current of the switching Faraday rotator 704.

The switch 700 is described above for a light traversing through the switch 700 in a forward direction. The switch 700 is bi-directional, thus it also will function for a light traversing through the switch 700 in a reversed direction, i.e., from port 1' to port 1 or from port 2' to port 1, occurs in a similar manner.

Figure 9:
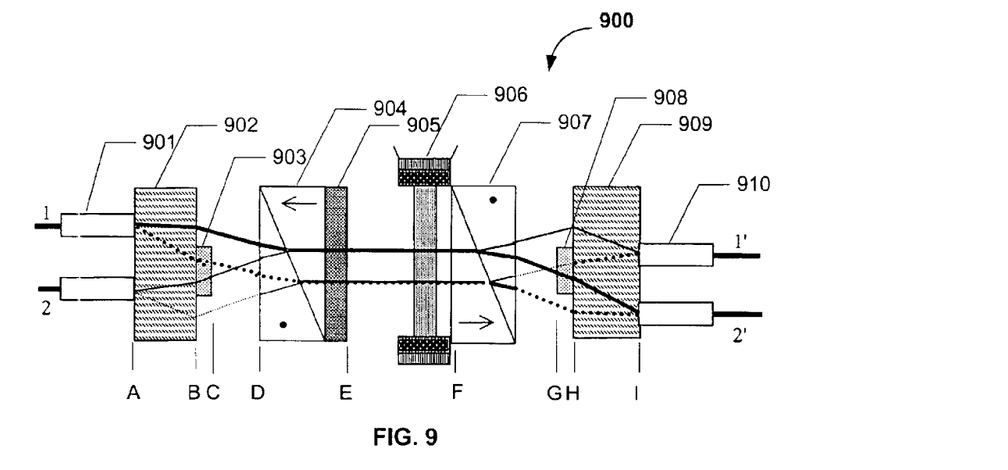
FIG. 9 illustrates a first preferred embodiment of a 2×2 magnetooptic switch in accordance with the present invention.

FIG. 9 illustrates a first preferred embodiment of a 2×2 magnetooptic switch in accordance with the present invention. The switch 900 is a transmissive type and comprises collimators 901 and 910, PBS's 902 and 909, rotators 903 and 908, Wollaston prisms 904 and 907, a latched Faraday rotator 905, and a switching Faraday rotator 906. The collimators 901 are optically coupled to the input ports 1 and 2, and the collimators 910 are optically coupled to the output ports 1' and 2'. The rotators 903 and 908 rotate the polarization direction of light by approximately 90 degrees. They may comprise either Faraday rotators or half-wave plates. The latched Faraday rotator 905 rotates the polarization direction of light by approximately 45 degrees. The switching Faraday rotator 906 rotates the polarization direction of light either by approximately 45 degrees CW or 45 degrees CCW.

Figure 10:
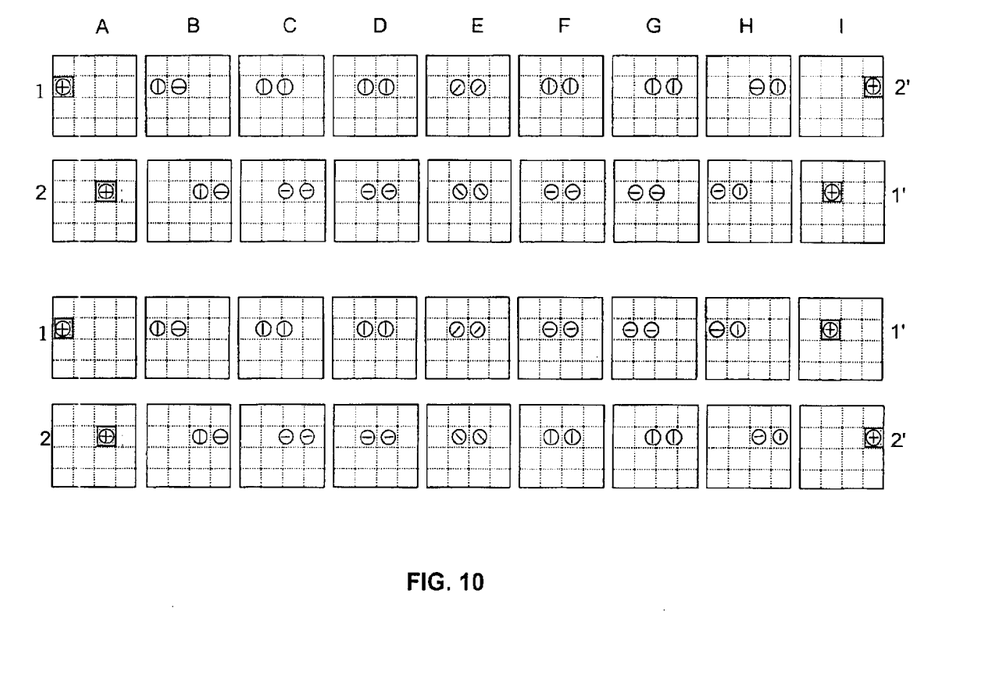
FIG. 10 illustrates the polarization states and positions of the light after passing through each component of the switch illustrated in FIG. 9.

FIG. 10 illustrates the polarization states and positions of the light after passing through each component of the switch 900 illustrated in FIG. 9. The states and positions illustrated at each letter A–I correspond to locations A–I at the switch 900, as labeled in FIG. 9. The upper two diagrams illustrate lights when they travel between port 1 and port 2', and between port 2 and port 1'(i.e., cross connection). The lower two diagrams illustrate lights when they travel between port 1 and port-1' and between port 2 and port 2'(i.e., parallel connection).

Referring to both FIGS. 9 and 10, a first arbitrarily polarized light is input through the input port 1 and collimated by collimators 901 at location A. The first PBS 902 separates the light into an o-beam and an e-beam (bent "downward" as illustrated in FIG. 9) at position B. The rotator 903 rotates the polarization direction of the e-beam about 90 degrees, turning it into an o-beam at location C. The two beams then travel in parallel to location D. The paths of the two parallel beams bend when they travel through the first Wollaston prism 904. They are rotated by about 45 degrees CW after passing through the latched Faraday rotator 905 at location E. They are rotated by about 45 degrees CCW after passing through the switching Faraday rotator 906 at location F, turning them into o-beams. Their paths are bent "downward" when they travel through the second Wollaston prism 907 at location G. After passing through the rotator 908, one of the o-beams is rotated about 90 degrees, switched into an e-beam, while the other o-beam remains unchanged at location H. The o- and e-beams are combined when they traverse through the second PBS 909 at location I. The combined beam is output to port 2'.

The switching Faraday rotator 906 can rotate the two beams by about 45 degrees CW rather than CCW. As illustrated in the lower two diagrams of FIG. 10, the two beams traversing therethrough would become e-beams at location F. One of the e-beams is rotated by about 90 degrees by the rotator 908, switching it to an o-beam, while the other e-beam remains unchanged at location H. The o- and e-beams are combined and output to port 1'. In the same principle of polarization manipulation, an input beam from port 2 can arrive at either at port 1' or 2' simply by changing the rotation direction of the switching Faraday rotator 906, i.e., 45 degrees CW or CCW.

The switch 900 is bi-directional, i.e., when light travels in a reversed direction, and port 1' and 2' are used as input ports and ports 1 and 2 are used as output ports, the switch 900 still functions.

Figure 11:
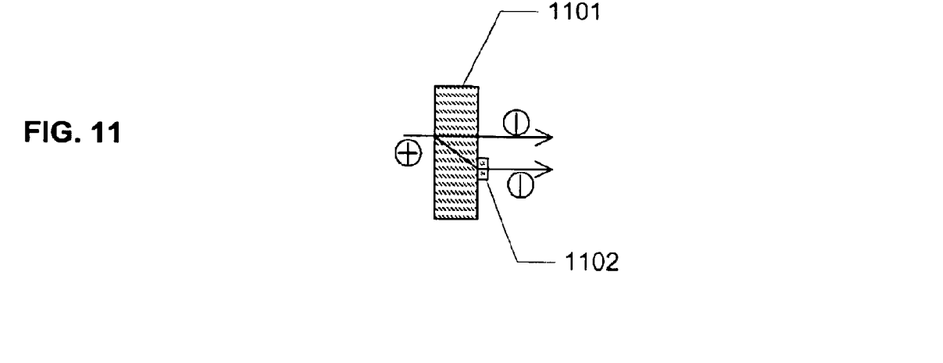
FIG. 11 illustrates a polarization beam splitter combined with a rotator in accordance with the present invention.

FIG. 11 illustrates a polarization beam splitter combined with a rotator in accordance with the present invention. The PBS 1101 splits a light with arbitrary polarization into an o- and an e-beam and displaces the e-beam. The rotator 1102 rotates the polarization direction of the e-beam by approximately 90 degrees, changing it into an o-beam. The rotator 1102 can be either a half-wave plate with its optical axis tilted 45 degrees with respect to the polarization direction of the e-beam, or a latched Faraday rotator. Two beams exit the PBS 1101/rotator 1102 combination in parallel.

Figure 12:
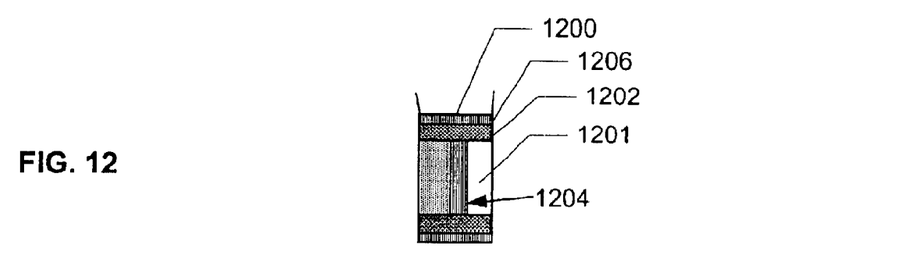
FIG. 12 illustrates a reflective switching Faraday rotator mounted in a ferrite core and electric coil in accordance with the present invention.

FIG. 12 illustrates a reflective switching Faraday rotator mounted in a ferrite core/coil in accordance with the present invention. The reflective switching Faraday rotator 1200 comprises a Faraday rotator 1201, a ferrite core 1202, and an electric coil 1206 surrounding the ferrite core 1202. The back side of the Faraday rotator 1201 is coated with a high reflection layer 1204. The polarization direction of a light traversing through the reflective switching Faraday rotator 1200 is rotated by either 0 degrees or 45 degrees, approximately, in a forward traverse through the Faraday rotator 1201. The light is then reflected by the high reflection layer 1204. The polarization direction of the light is further rotated by either 0 degrees or 45 degrees, approximately, in the reverse traverse through the Faraday rotator 1201, resulting in a total rotation of either about 0 degrees or 90 degrees.

Figure 13:
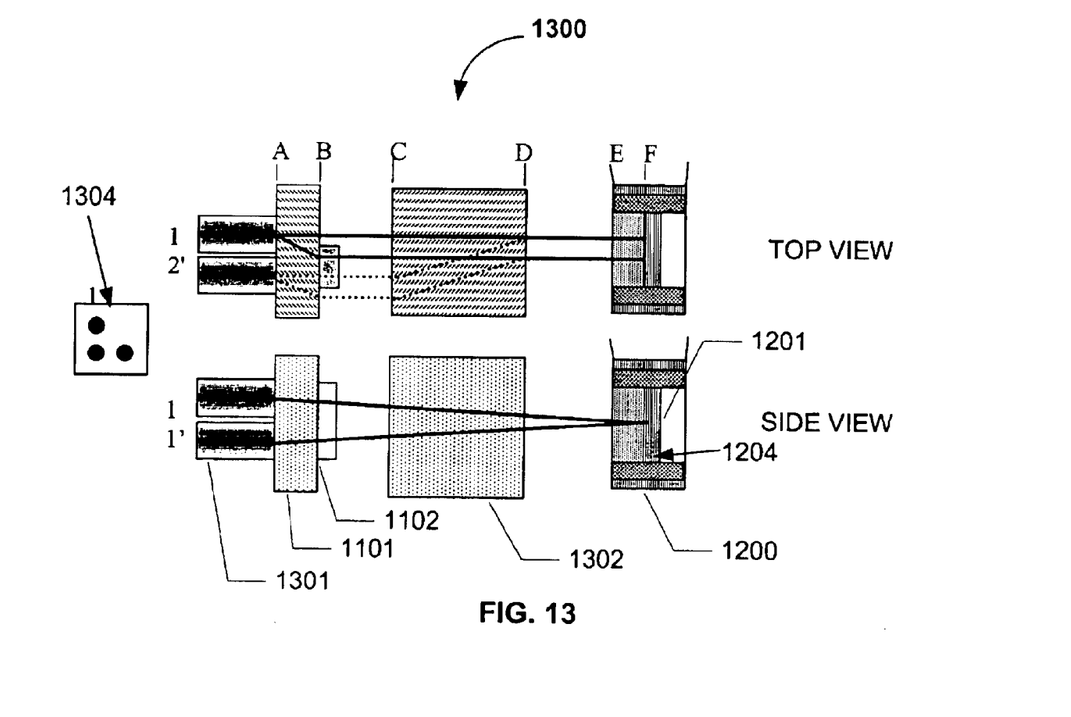
FIG. 13 illustrates a reflective polarization independent 1×2 magnetooptic switch using a polarization walk-off plate in accordance with the present invention.

FIG. 13 illustrates a reflective polarization independent 1×2 switch using a polarization walk-off plate in accordance with the present invention. The switch 1300 utilizes the reflective switching Faraday rotator 1200 illustrated in FIG. 12 to create a reflective-type switch. The switch 1300 comprises collimators 1301, the PBS 1101, the rotator 1102, a polarization walk-off plate 1302, and a reflective switching Faraday rotator 1200. The collimators 1301 are optically coupled to an input port 1 and output ports 1' and 2'. Box 1304 illustrates a cross-sectional view of the collimators 1301, showing their positions. The PBS 1101 and rotator 1102 function in the same manner as described above with reference to FIG. 11. The combined beams are rotated and reflected by the reflective switching Faraday rotator 1200, as described above with reference to FIG. 12. The beams then traverse through the polarization walk-off plate 1302 which displaces the beams, the rotator 1102, the PBS 1101, and the collimator 1301, in a reverse direction. The light is output to either port 1' or 2', depending upon the direction of the current provided to the electric coil 1206 of the reflective switching Faraday rotator 1200.

Figure 14:
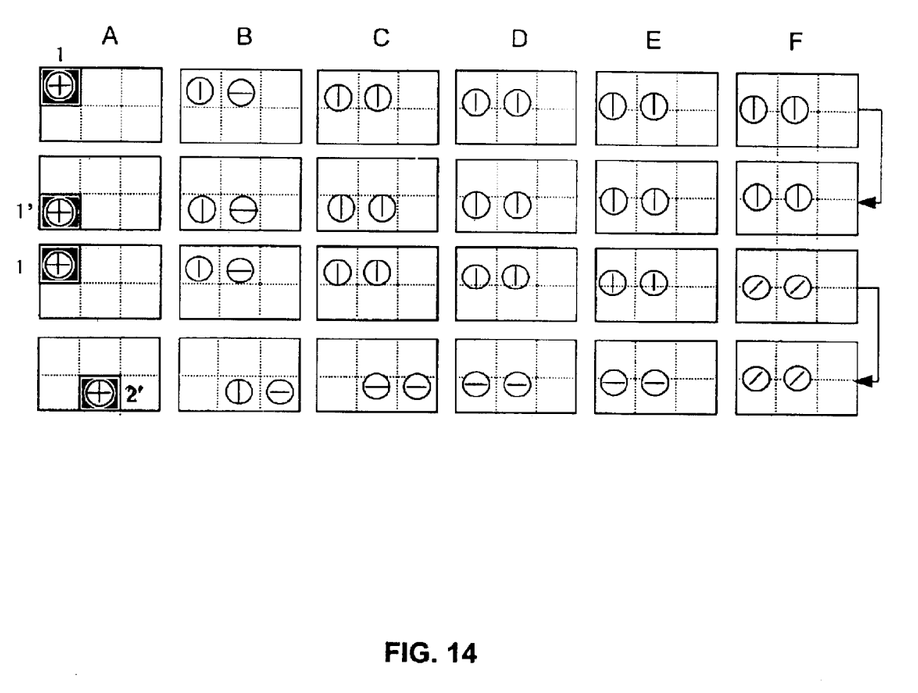
FIG. 14 illustrates the polarization states and positions of the light after passing through each component of the switch illustrated in FIG. 13.

FIG. 14 illustrates the polarization states and positions of the light after passing through each component of the switch 1300 illustrated in FIG. 13. The states and positions illustrated at each letter A–F correspond to locations A–F at the switch 1300, as labeled in FIG. 13. The upper two diagrams illustrate a light when it travels from port 1 to port 1'. The lower two diagrams illustrate a light when in travels from port 1 to port 2'.

Referring to both FIGS. 13 and 14, a light with arbitrary polarization is input through the input port 1, and collimated by collimators 1301 at location A. The PBS 1101 splits the light with arbitrary polarization into an o- and an e-beam and displaces the e-beam at location B. The rotator 1102 rotates the polarization direction of the e-beam by approximately 90 degrees, changing it into an o-beam. The two o-beams exit the rotator 1102 in parallel at location C. The polarization directions of the parallel beams are rotated by either about 0 degrees or 45 degrees by a forward traverse through the Faraday rotator 1200 at location F. In the upper diagram of FIG. 14, the switching Faraday rotator 1200 rotates the polarization direction of the parallel beams by about 0 degrees. In the lower diagram of FIG. 14, the switching Faraday rotator 1200 rotates the polarization direction of the parallel beams by about 45 degrees. The beams are then reflected by the high reflection layer 1204. The polarization direction of the beams is further rotated by either about 0 degrees or 45 degrees by a reverse traverse through the Faraday rotator 1201 at location E, resulting in a total rotation of either about 0 degrees or 90 degrees. The polarization walk-off plate 1302 displaces the beams at location C. The latched rotator 1102 rotates a polarization direction of one beam by about 90 degrees while the other beam remained unchanged at location B. The PBS 1101 combines the two beams at location A. The combined beams are output to either port 1' or 2', depending upon the rotation direction of the switching Faraday rotator 1200.

The switch 1300 is bi-directional, i.e., when light travels in a reversed direction, and port 1' or 2' is used as an input port and port 1 is used as an output port, the switch 1300 still functions.

Figure 15:
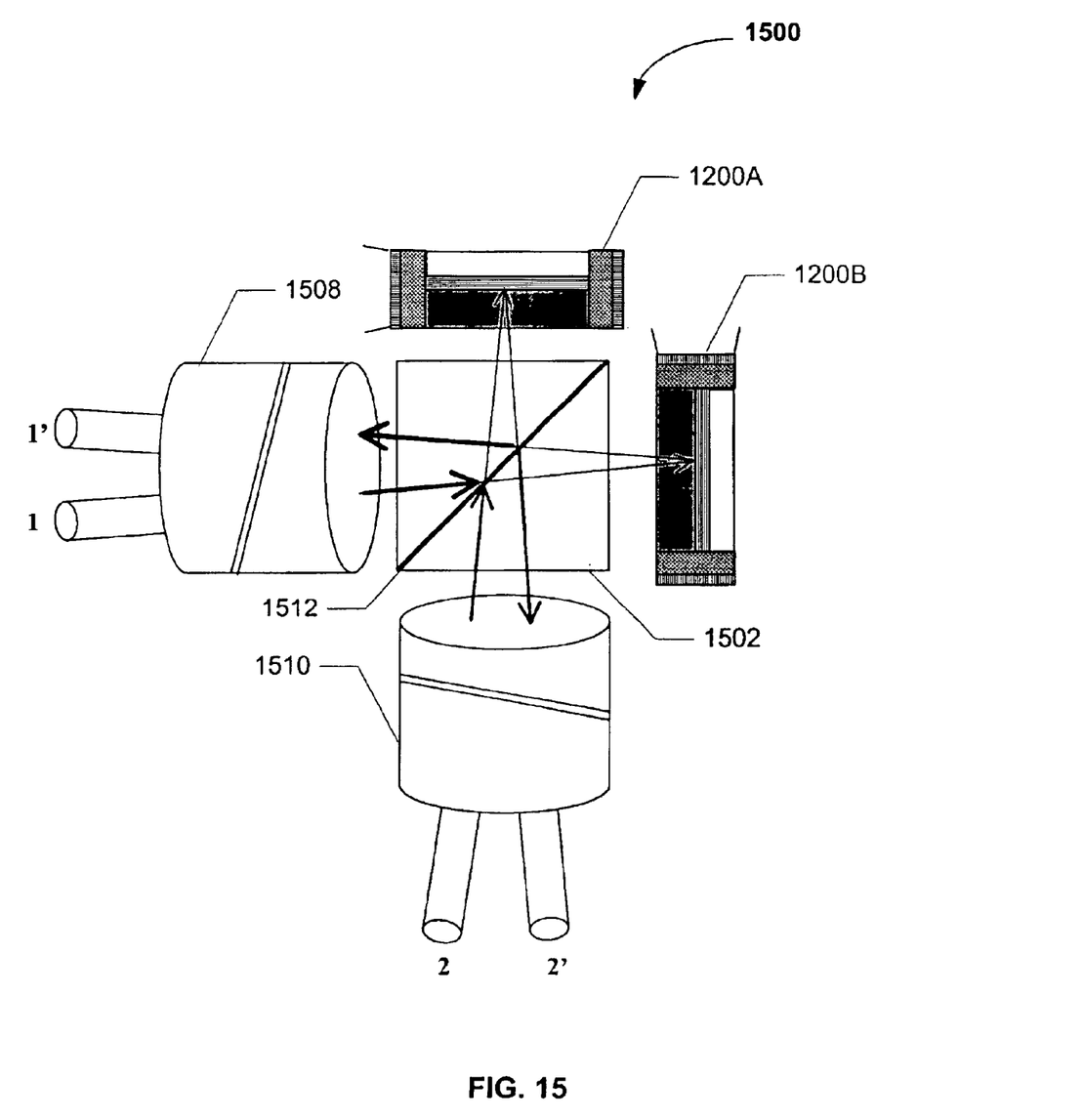
FIG. 15 illustrates a polarization independent 2×2 magnetooptic switch utilizing a cubic polarization beam splitter (Glan-Thompson) and two reflective switching Faraday rotators in accordance with the present invention.

FIG. 15 illustrates a polarization independent 2×2 magnetooptic switch utilizing a cubic polarization beam splitter (Glan-Thompson) and two reflective switching Faraday rotators in accordance with the present invention. The switch 1500 comprises a cubic PBS 1502 and two reflective switching Faraday rotators 1200A and 1200B. The two reflective switching Faraday rotators 1200A and 1200B each has the same structure, and function in the same manner, as the reflective switching Faraday rotator 1200, described above with reference to FIG. 12. The switch 1500 further comprises two dual-fiber collimators 1508 and 1510. The collimators 1508 and 1510 may be GRIN lenses. The collimator 1508 is optically coupled to a first input port 1 and a first output port 1'. The collimator 1510 is optically coupled to a second input port 2 and a second output port 2'.

A first light with arbitrary polarization is input from the first input port 1. It traverses the collimator 1508 to the cubic PBS 1502. The cubic PBS 1502 decomposes the light based on it its polarity. The portion of the light vertical to a plane 1512 in the cubic PBS 1502 is reflected toward the first reflective switching Faraday rotator 1200A. The portion of the light parallel to the plane 1512 is transmitted to the second reflective switching Faraday rotator 1200B. The reflective switching Faraday rotators 1200A and 1200B manipulate the polarization of the portions, as described above with FIG. 12, and reflects the light either with a polarization rotation of about 0 degrees or 90 degrees. If there is no polarization rotation, the cubic PBS 1502 lets the light travel to output port 1'. If there is a 90 degree polarization rotation, the light will be reflected by the cubic PBS 1502 and exit output port 2'. Similarly, input light from port 2 can be switched to either 1' or 2' depending on the polarization rotation of the reflective switching Faraday rotators 1200A and 1200B.

The switch 1500 is bi-directional, i.e., when light travels in a reversed direction, and port 1' and 2' are used as input ports and ports 1 and 2 are used as output ports, the switch 1500 still functions.

Figure 16:
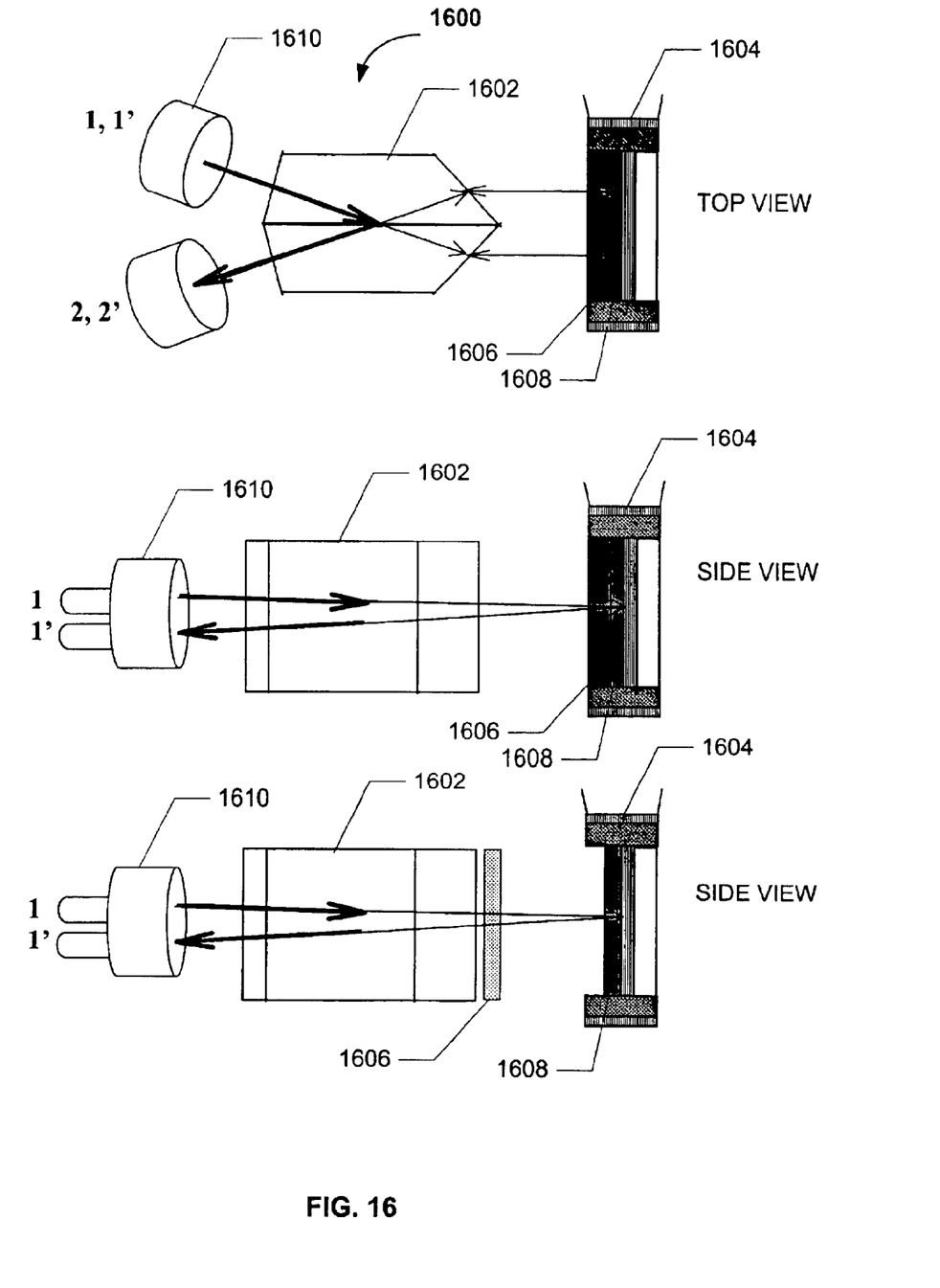
FIG. 16 illustrates a top view and a side view of a polarization independent 2×2 magnetooptic switch utilizing a special-shape polarization beam splitter (Glan-Thompson) and one reflective-type switching Faraday rotator in accordance with the present invention.

FIG. 16 illustrates a top view and a side view of a polarization independent 2×2 magnetooptic switch utilizing a special-shape polarization beam splitter (Glan-Thompson) and a reflective-type switching Faraday rotator in accordance with the present invention. The switch 1600 comprises a dual fiber collimator 1610, a special Glan-Thompson PBS 1602, and a switching Faraday rotator 1604. The switching Faraday rotator 1604 can comprises of two Faraday rotators, one latching rotator (45 degrees) and one switching rotator (45 degrees), as illustrated in the upper two diagrams. The switching Faraday rotator 1604 can also be comprised of one Faraday rotator 1608 (45 degrees) with the other 45 degree rotation being provided by another latched Faraday rotator 1606 external to the switching Faraday rotator 1604, as illustrated in the bottom diagram. The switching Faraday rotator 1604 rotates a polarization direction of a light either by a total of about 0 degrees or 90 degrees in the same manner as the switching Faraday rotator 1200, illustrated in FIG. 12. The switching Faraday rotator 1604 can also be used in the switches 1300 and 1500, illustrated in FIGS. 13 and 15, or with any other reflective type magnetooptic switch.

The special-shape PBS 1602 splits an arbitrarily polarized input beam into o- and e- beams. The o and e-beams traverse to the reflective switching Faraday rotator 1604, which manipulate the polarization of the portions, as described above with FIG. 12, and reflects the light either with a polarization rotation of about 0 degrees or 90 degrees. If there is no polarization rotation, the special-shaped PBS 1602 lets the light travel to output port 1'. If there is a 90 degree polarization rotation, the light will be reflected by the special-shaped PBS 1602 and exit output port 2'. Similarly, input light from port 2 can be switched to either 1' or 2' depending on the polarization rotation of the reflective switching Faraday rotator 1604. Unlike the switch 1500, the switch 1600 only require one reflective switching Faraday rotator 1604.

The switch 1600 is bi-directional, i.e., when light travels in a reversed direction, and port '1 and 2' are used as input ports and ports 1 and 2 are used as output ports, the switch 1600 still functions.

Figure 17:
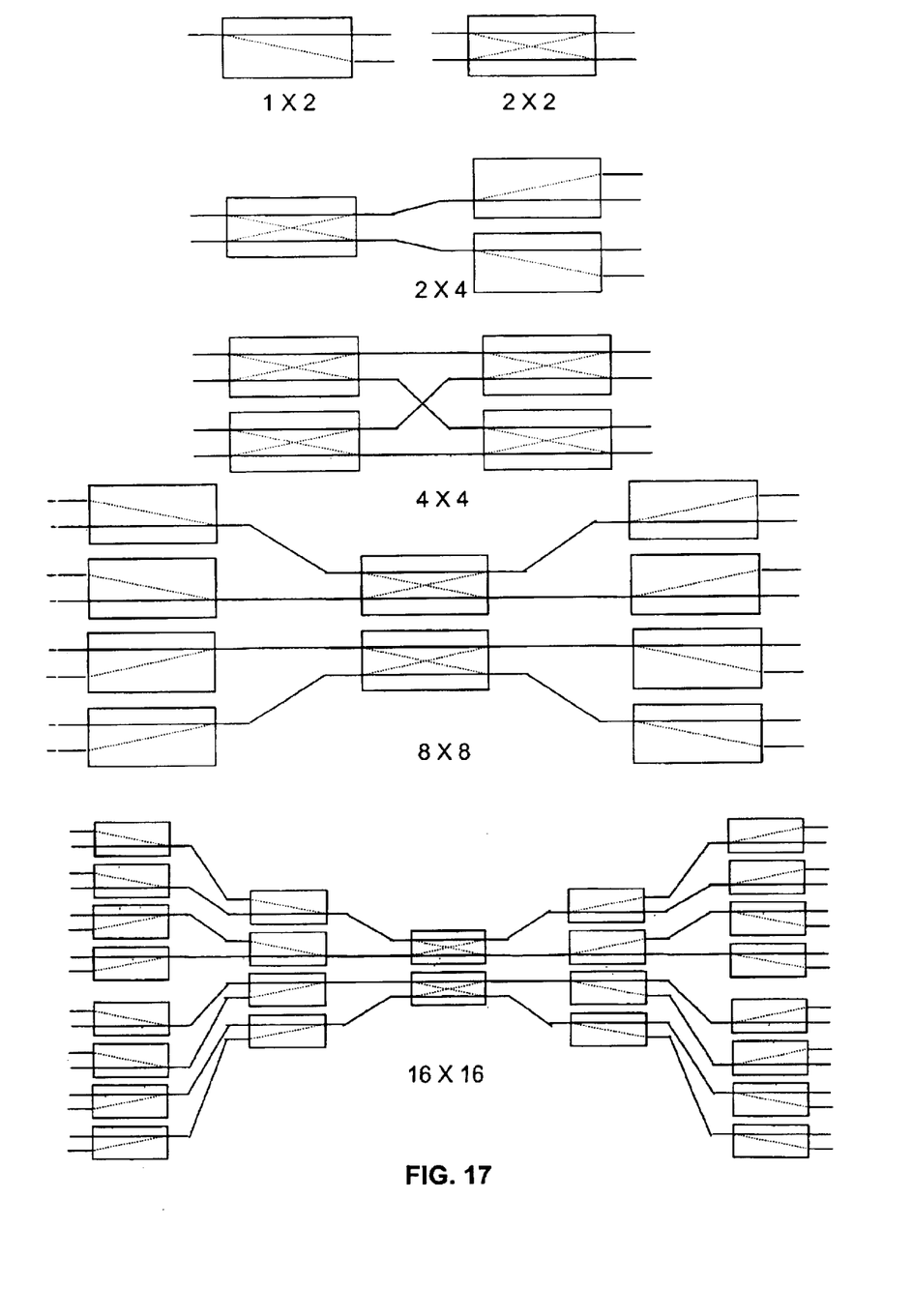
FIG. 17 illustrates large port (2×4, 4×4, 8×8, and 16×16) magnetooptic switches which can be made from the preferred embodiments of the 1×2 and 2×2 switches, discussed in FIGS. 2–16, in accordance with the present invention.

FIG. 17 illustrates large port (2×4, 4×4, 8×8, and 16×16) magnetooptic switches which can be made from the preferred embodiments of the 1×2 and 2×2 switches, discussed in FIGS. 2–16, in accordance with the present invention. Any of the described embodiment may be used in any combination to create these large port magnetooptic switches. A polarization independent magnetooptic switch has been disclosed. The switch utilizes a switching Faraday rotator comprising a Faraday rotator, a ferrite core, and an electric coil surrounding the ferrite core. A direction of a current provided to the electric coil determines the direction of polarization rotation of a light traversing through the switching Faraday rotator. When used in combination with polarization beam splitters/combiners, polarization walk-off plates, and rotators, a fast polarization independent magnetooptic switch is provided. Both transmissive and reflective switches may be created. In addition to high speed, the switch in accordance with the present invention also provides low insertion loss, low PDL, and low PMD. It is compact in size, with no moving parts and no liquid or organic material in the optical path.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetooptic switch, comprising:
    a polarization beam splitter (PBS) optically coupled to at least one input port, a first output port, and a second output port;
    a first and a second latched rotator optically coupled to the PBS at a side opposite to the at least one input port, the first output port, and the second output port;
    a switching rotator optically coupled to the first and second latched rotators at a side opposite to the PBS, wherein the switching rotator comprises:
        a switchable Faraday rotator optically coupled to the first and second Latched rotators,
        a ferrite core surrounding the Faraday rotator, and
        an electric coil surrounding the ferrite core, wherein a direction of a current supplied to the electric coil determines a direction of rotation of a polarization of a light traversing through the Faraday rotator;
        a Wollaston prism optically coupled to the Faraday rotator of the switching rotator at a side opposite to the first and second latched rotators; and
        a reflector optically coupled to the Wollaston prism at a side opposite to the switching rotator, wherein the reflector reflects light back through the Wollaston prism, the switching rotator, the first and second latched rotators, and the PBS, wherein the reflected light is received either by the first output port or the second output port as determined by the direction of the current supplied to the electric coil.

2. The switch of claim 1, wherein positions of the first and second latched rotators and the switching rotator is interchangeable.

3. The switch of claim 1, wherein with light traversing through the switch in a forward direction, the PBS receives an unpolarized light from the at least one input port, wherein the PBS splits the unpolarized light into a first sub-beam with a first polarization direction and a second sub-beam with a second polarization direction.

4. The switch of claim 3, wherein with light traversing through the switch in a reverse direction, the PBS receives the first sub-beam from the first latched rotator and the second sub-beam from the second latched rotator, wherein the PBS combines the first and second sub-beams into the unpolarized light, wherein the unpolarized light traverses the PBS to either the first output port or the second output port as determined by the direction of the current supplied to the electric coil.

5. The switch of claim 4, wherein for light traversing through the switch in a forward direction, the first latched rotator receives the first sub-beam from the PBS, wherein the first latched rotator rotates the polarization direction of the first sub-beam in a first direction.

6. The switch of claim 5, wherein for light traversing through the switch in a reverse direction, the first latched rotator receives the first sub-beam from the switching rotator, wherein the first latched rotator rotates the polarization direction of the first sub-beam in the first direction.

7. The switch of claim 4, wherein for light traversing through the switch in a forward direction, the second latched rotator receives the second sub-beam from the PBS, wherein the second latched rotator rotates the polarization direction of the second sub-beam in a second direction.

8. The switch of claim 7, wherein for light traversing through the switch in a reverse direction, the second latched rotator receives the second sub-beam from the switching rotator, wherein the second latched rotator rotates the polarization direction of the second sub-beam in the second direction.

9. The switch of claim 4, wherein for a first direction of the current, the switching rotator rotates the polarization directions of the first and second sub-beams in a first direction, wherein for a second direction of the current, the switching rotator rotates the polarization directions of the first and second sub-beams in a second direction.

10. The switch of claim 4, wherien the Wollaston prism receives the first and second sub-beams, wherein the Wollaston prism displaces the first and second sub-beams.

11. A system, comprising:
an optical network, the optical network comprising:
at least one input port for providing an optical signal with an arbitrary polarization,
a first output port, and
a second output port; and
a magnetooptic switch, comprising:
a PBS optically coupled to at least one input port,
a first and a second latched rotator optically coupled to the PBS at a side opposite to the at least one input,
a switching rotator optically coupled to the first and second latched rotators at a side opposite to the PBS wherein the switching rotator comprises:
a switchable Faraday rotator optically coupled to the first and second latched rotators,
a ferrite core surrounding the switchable Faraday rotator, and
an electric coil surrounding the ferrite core, wherein a direction of a current supplied to the electric coil determines a direction of rotation of a polarization of a light traversing through the switchable Faraday rotator;
a Wollaston prism optically coupled to the switchable Faraday rotator of the switching rotator at a side opposite to the first and second latched rotators, and
a reflector optically coupled to the Wollaston prism at a side opposite to the switching rotator, wherein the reflector reflects light back through the Wollaston prism, the switching rotator, the first and second latched rotators, and the PBS, wherein the reflected light is received either by the first output or the second output as determined by the direction of the current supplied to the electric coil.

12. A system, comprising:
a plurality of switches optically coupled to each other, wherein at least one of the plurality of switches comprises:
a PBS optically coupled to an input port,
a first and a second latched rotator optically coupled to the PBS at a side opposite to the input port,
a switching rotator optically coupled to the first and second latched rotators at a side opposite to the PBS, wherein the switching rotator comprises:
a switchable Faraday rotator optically coupled to the first and second latched rotators,
a ferrite core surrounding the switchable Faraday rotator, and
an electric coil surrounding the ferrite core, wherein a direction of a current supplied to the electric coil determines a direction of rotation of a polarization of a light traversing through the switchable Faraday rotator,
a Wollaston prism optically coupled to the switchable Faraday rotator of the switching rotator at a side opposite to the first and second latched rotators, and
a reflector optically coupled to the Wollaston prism at a side opposite to the switching rotator, wherein the reflector reflects light back through the Wollaston prism, the switching rotator, the first and second latched rotators, and the PBS, wherein the reflected light is received either by a first output or a second output as determined by the direction of the current supplied to the electric coil; and
an optical signal traversing through at least one of the plurality of switches.

* * * * *